May 29, 1962 D. PURCELL 3,036,516
APPARATUS FOR CRUSHING SCRAP METAL
Filed March 7, 1960 3 Sheets-Sheet 1

*INVENTOR.*
DUPREE PURCELL

BY Harvey & Harvey

ATTORNEYS

May 29, 1962 D. PURCELL 3,036,516
APPARATUS FOR CRUSHING SCRAP METAL
Filed March 7, 1960 3 Sheets-Sheet 2
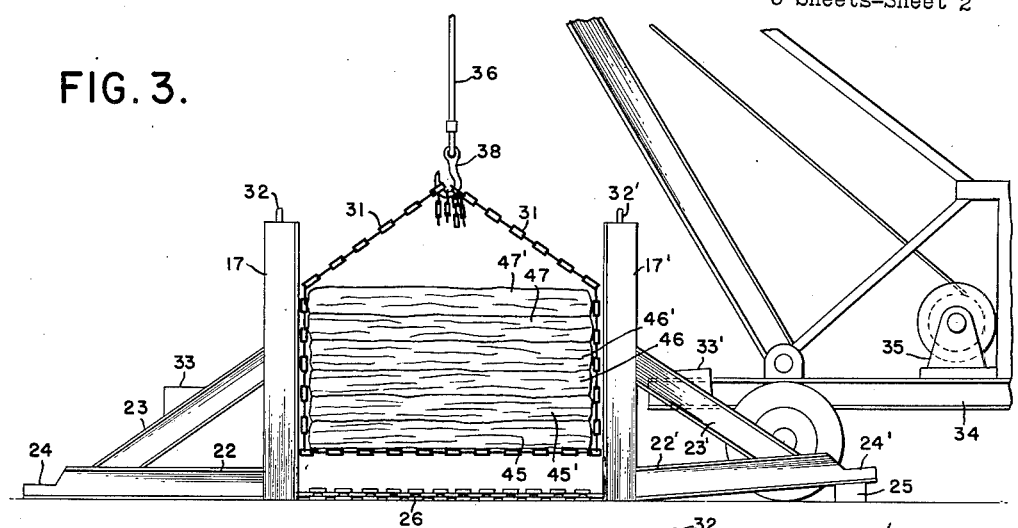
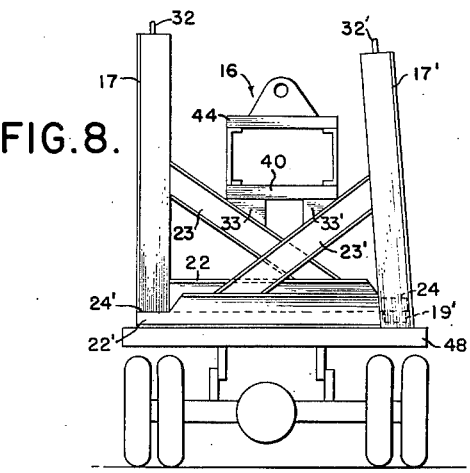
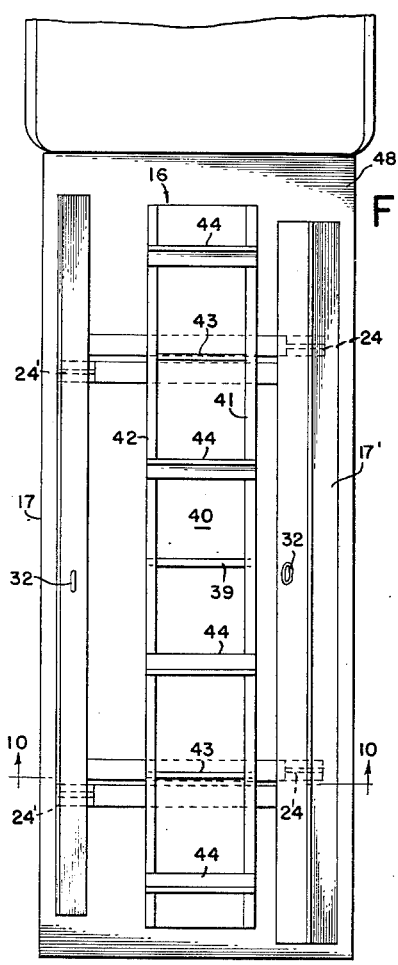
INVENTOR.
DUPREE PURCELL
ATTORNEYS May 29, 1962 D. PURCELL 3,036,516
APPARATUS FOR CRUSHING SCRAP METAL
Filed March 7, 1960 3 Sheets-Sheet 3
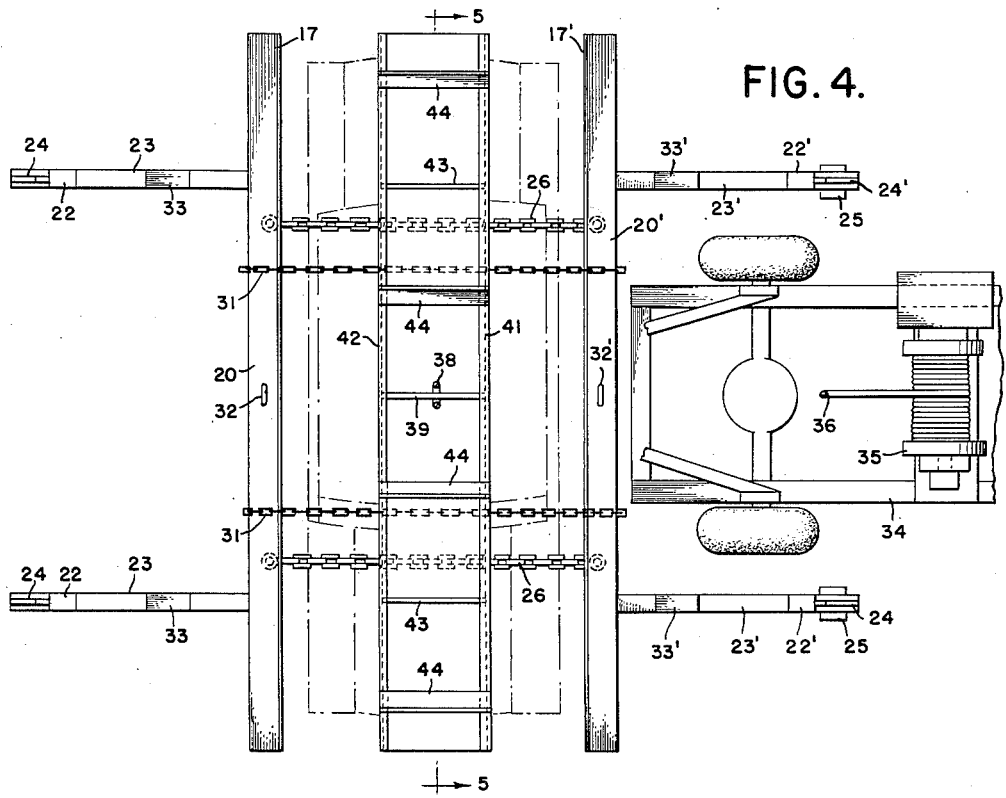
FIG. 4.
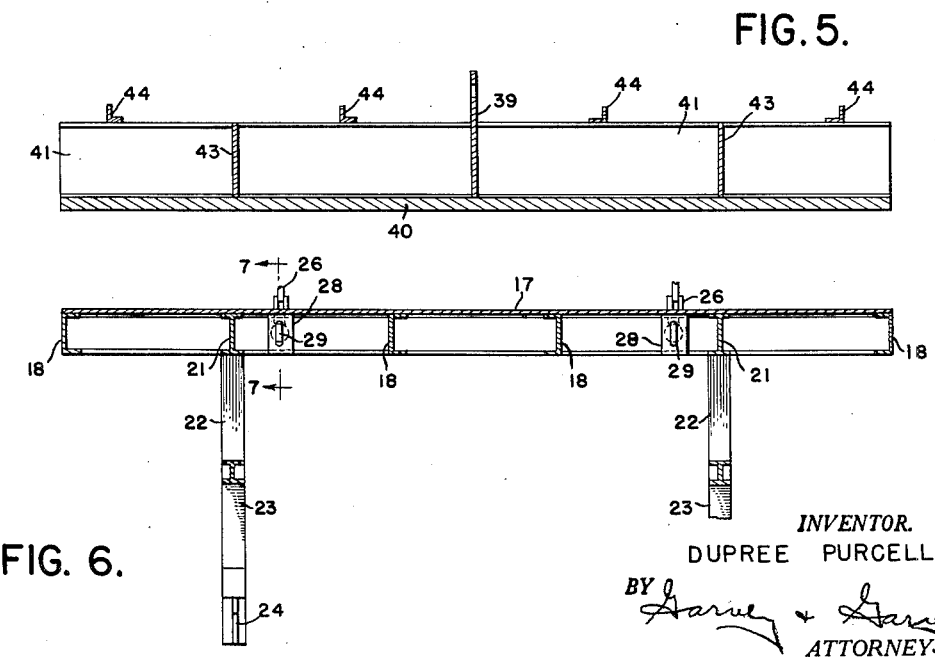
FIG. 5.
FIG. 6.
INVENTOR.
DUPREE PURCELL
BY
ATTORNEYS United States Patent Office 3,036,516
Patented May 29, 1962

3,036,516
APPARATUS FOR CRUSHING SCRAP METAL
Dupree Purcell, P.O. Box 442, La Grange, Ga.
Filed Mar. 7, 1960, Ser. No. 13,146
3 Claims. (Cl. 100—214)

This invention relates to an apparatus for crushing scrap metal and particularly scrap automobile bodies, preparatory to further processing thereof by a large hydraulic press.

The metal in automobile bodies and similar bulky objects has heretofore been conventionally salvaged by cutting the bodies into relatively flat pieces with a cutting torch, following which the pieces are loaded on a truck and transported to a large hydraulic press where they are baled under high pressure. This is a time-consuming and costly process and is compounded where the hydraulic press is located a considerable distance away, since it has been found that the amount of scrap that can be loosely loaded on a truck is considerably less than the truck's capacity. Consequently, the volume of scrap which can be baled is necessarily limited. Various machines have been devised which are intended to solve this problem, such as shown and described in Patent No. 2,353,221, granted July 11, 1944, to P. Clifton et al., but devices of this nature have proven impractical in actual use.

It is, therefore, an object of this invention to provide a portable scrap metal crushing machine for salvaging bulky scrap metal and particularly scrap automobile bodies by reducing a predetermined quantity thereof to a relatively flat state in a single operation, following which the flattened bundle may be readily lifted and loaded onto a truck for transportation to a large hydraulic press for further processing.

Another object is to provide a method of crushing scrap automobile bodies by placing two or more automobile bodies in a confining chamber, delivering crushing impacts from above until the bodies are relatively flat, and repeating this cycle until the vertical limit of the chamber has been reached.

Other objects are to provide a portable scrap metal crushing machine adapted to partly process scrap automobile bodies and the like by mechanically flattening the bodies to approximately 10% of their original height, a plurality of the bodies being crushed together to form a unitary bundle; to provide a portable machine of the character described including strand means adapted to cradle the compressed metal bundle to facilitate lifting thereof from the machine; to provide a machine which may be readily disassembled and loaded on a conventional truck for removal from one site to another, and to provide a portable scrap metal crushing machine of economical construction made of conventional, readily assembled parts.

Other objects of the invention will be manifest from the following description of the present preferred form of the invention, taken in connection with the accompanying drawings, wherein:

FIG. 3 is an end elevational view of the crushing machine of the present invention illustrating the manner of lifting a crushed metal bundle from the machine upon completion of the crushing operation;

FIG. 4 is a top plan view of the device of the present invention in operating position;

FIG. 5 is a longitudinal sectional view taken along the line 5—5 of FIG. 4 looking in the direction of the arrows and showing to advantage the crusher, forming a part of the present invention;

FIG. 6 is a horizontal sectional view taken along the line 6—6 of FIG. 2 looking in the direction of the arrows, showing a wall member forming a part of the present invention;

FIG. 8 is a rear elevational view of the portable machine of the present invention showing it disassembled and loaded on a truck for removal from one site to another;

FIG. 9 is a top plan view of the same; and

FIG. 10 is a fragmentary sectional view taken along the line 10—10 of FIG. 9 looking in the direction of the arrows and showing to advantage the manner of loading the present machine on a truck.

Referring now in greater detail to the drawings, the machine of the present invention generally comprises a confining chamber 15 and a crushing or packing assembly 16 pendently supported above chamber 15 and adapted for crushing engagement with scrap automobile bodies or the like within the chamber.

Figure 1:
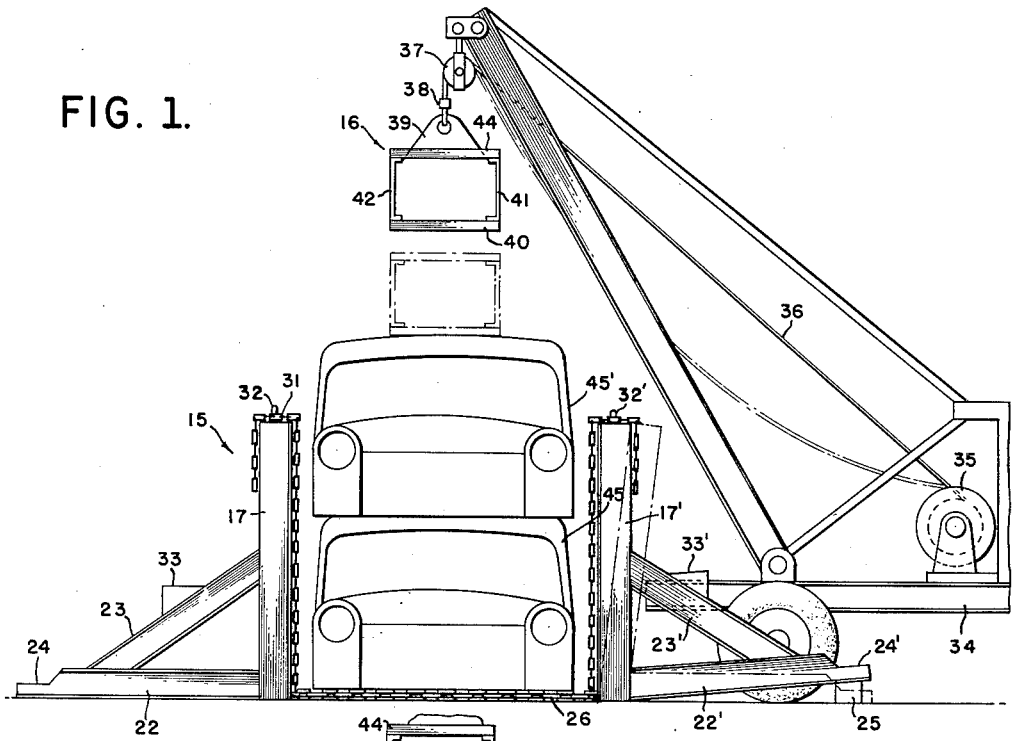
FIG. 1 is a end elevational view of the crushing machine of the present invention illustrating its operation.
Figure 2:
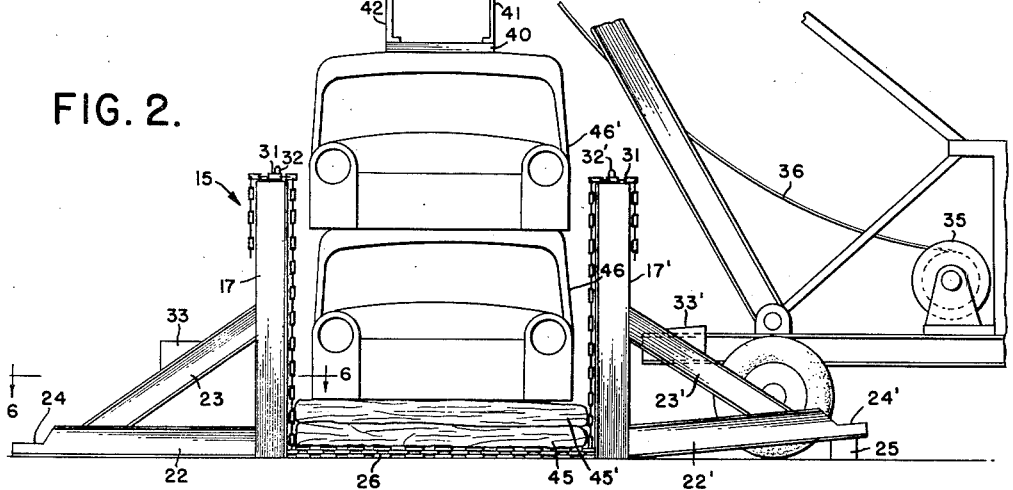
FIG. 2 is a view similar to FIG. 1, but showing another cycle of the crushing operation.

Confining chamber 15 is a trough-like member formed by a pair of similar walls 17 and 17' of heavy steel plate construction preferably of rectangular conformation and adapted to be stood on their longitudinal edges in opposed, spaced, parallel relationship. The rear face of each of the walls is similarly braced, the bracing structure of wall 17 being shown in FIG. 6 and including a plurality of spaced vertical channel beams 18 coextensive with the length of the wall. There is further provided a bottom horizontal support 19 and a top horizontal support 20 at the lower and upper limits of the wall, these supports being of channel beam construction. Supports 19 and 20 are likewise coextensive with the wall's length. In spaced relation to each end of wall 17 is a pair of vertical I-beams 21. Pairs of I-beam wall supports, designated 22 and 22', extend outwardly from the respective vertical I-beams of walls 17 and 17', which members are braced by angular pieces 23 and 23' extending from the wall supports to the vertical I-beams. As shown to advantage in FIG. 1, the outer extremities of wall supports 22 and 22' are reduced at their outer terminals to form supporting shelves 24 and 24', the functions of which will be hereinafter more fully set out. In this connection also, it will be apparent from a consideration of FIGS. 1 to 3 that wall support 22 extends at a 90° angle to wall 17 so that when the former is placed flat on the ground, the latter assumes a vertical position. In contrast, wall support 22' forms an angle of less than 90° with wall 17' so that the latter assumes the position shown by dotted lines in FIG. 1 when support 22' is placed flat on the ground. Therefore, in accordance with the present invention, there are provided blocks 25 of predetermined height adapted to be placed under the terminals of supports 22' when the latter are in operative position, as shown in FIGS. 1 to 3, in order that wall 17' may normally assume a vertical position.

Figure 7:
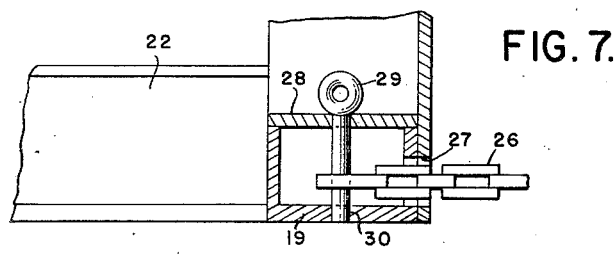
FIG. 7 is an enlarged sectional view taken along the line 7—7 of FIG. 6 looking in the direction of the arrows illustrating the manner of joining the wall members together.

It is further within the contemplation of the present invention to provide a pair of chains 26 extending in spaced relation to each other and to the wall terminals between the bases of walls 17 and 17' to prevent the walls from spreading apart in operation. As shown in FIG. 7, each chain is detachably engaged with the respective walls 17 and 17'. Attachment is effected by training terminals of each chain through an opening 27 in the base of the wall and connected bottom horizontal support. Superjacent opening 27, a perforate top place 28 spans the terminals of the U-shaped bottom support, through which perforation a drop pin 29 passes to engage the opening of the terminal link of chain 26, the lower terminal of pin 29 being adapted to engage a complemental opening 30 in the base of the bottom horizontal support. By insertion and removal of drop pin 29, therefore, chains 26 may be rapidly attached to, and disengaged from, walls 17 and 17'.

In addition to chains 26, it will be noted, from FIGS. 1 to 4, that there is provided a second pair of chains 31 adapted for placement in spaced relation between chains 26. The intermediate sections of chains 31 are laid on the ground between walls 17 and 17' and the terminal portions thereof are drawn vertically up and over walls 17 and 17' so that the terminals hang down the back faces of the walls. Chains 31 serve to cradle the bundle of crushed metal located between the walls 17 and 17' and, in conjunction with power means, enables the bundle to be readily removed from the confining chamber.

For purposes of transporting walls 17 and 17' from one site to another, hooks 32 and 32' are secured to the upper faces of top horizontal supports 20 and 20', thereby permitting the walls to be lifted by any suitable power means onto a truck. To further enhance the portability of the present machine, angular braces 23 and 23' are provided with intermediate steps or crushing assembly support members 33 and 33', the upper faces of which are parallel to wall supports 22 and 22'.

In association with crushing or packing assembly 16, there is provided a conventional crane truck 34 equipped with a friction clutch power-driven drop winch 35 to which is connected a cable 36 trained upwardly and over a suitably supported pulley 37. The terminal of cable 36 remote from winch 35 is provided with a suitable hook 38 engageable with a centrally located perforate plate 39 forming a part of crusher assembly 16, for pendently supporting the latter above confining chamber 15. As shown to advantage in FIGS. 4 and 5, assembly 16 further includes a heavy bottom plate 40 comprising the crushing elements, which plate is preferably coextensive with the length of walls 17 and 17'. Side pieces 41 and 42 having a lower terminal flange portion are connected to the lateral margins of plate 40, sides 41 and 42 being of lighter weight and of sufficient height to prevent material from hanging on the crusher after it has been dropped on the bodies between the walls. To reenforce assembly 16, there are provided spaced reenforcing plates 43 extending between sides 41 and 42 and secured in any suitable manner to the upper faces of plate 40. Central perforate plate 39 is secured to sides 41 and 42 and bottom plate 40 in a similar manner. A plurality of spaced angle iron pieces 44 span the upper terminals of side pieces 41 and 42 and are fixed to upper inwardly-extending flanges thereof, to lend greater rigidity to the assembly.

In use, the portable scrap metal crushing machine of the present invention is first assembled in the position shown in FIG. 1 with walls 17 and 17' spaced by chains 26 and with blocks 25 in position beneath the terminals of I-beam supports 22'. Chains 31 are then laid within confining chamber 15. In accordance with the teaching of the present invention, a pair of scrap automobile bodies 45 and 45' are placed between walls 17 and 17', following which crushing assembly 16 is permitted to gravitate into crushing engagement with the bodies. Assembly 16 is repeatedly lifted and dropped by operation of winch 35 until the bodies 45 and 45' are in a relatively flat state. This completes the first cycle of the crushing operation and, as shown in FIG. 2, two more scrap bodies 46 and 46' are placed between walls 17 and 17' on top of flattened bodies 45 and 45'. The crushing cycle is repeated until bodies 46 and 46' are in a relatively flat condition. Additional scrap bodies may be added to the confining chamber and the cycle repeated to flatten the bodies, two at a time, so that, as shown in FIG. 3, additional flattend bodies 47 and 47' are superimposed on flattened bodies 45, 45' and 46, 46'. It has been found that with the device of the present invention six crushed automobile bodies form a convenient size bundle, but this number may, of course, be increased or decreased, if desired. Upon completion of the crushing cycle, crusher assembly 16 is disengaged from hook 38 of cable 36, pursuant to which the terminals of chains 31 are engaged with the hook. Winch 35 is then actuated and the crushed scrap metal bundle in confining chamber 15 is gradually lifted therefrom and placed on a truck. The crushing operation is repeated until the truck is loaded to its weight capacity, after which the crushed scrap metal may be transported to a large hydraulic press for further processing. In the event that difficulty is encountered in withdrawing the crushed scrap metal bundle from confining chamber 15, blocks 25 may be removed to tilt wall 17' into the position shown in phantom lines in FIG. 1.

After the crushing of the bodies has been completed at one site and it is desired to remove the portable machine of the present invention to another site, chains 26 and 31 and blocks 25 are removed, after which hook 38 of crane truck 34 is engaged with hook 32' to lift the wall 17' and place it on a conventional flat bed truck 48, as shown in FIG. 8. It will be noted, from a consideration of FIG. 8, that wall 17' is adjacent a side edge of the truck and that wall supports 22' extend transversely of the truck bed to a point adjacent the opposite side thereof. Because of the angular relationship between supports 22' and wall 17', the latter is inclined inwardly toward the center of the bed slightly. This has been found to be important in the transportation of the present machine, since walls 17 and 17' are quite heavy and the inclination of wall 17' is necessary to prevent the latter from toppling off the truck when it is placed thereon with resultant weighing down of one side of the truck. After wall member 17' is placed on the truck, wall 17 is then lifted in a similar manner onto the truck and positioned so that the base rests on supporting shelves 24' of I-beam support 22' and the terminals of I-beam support 22 rest on the upper terminals of the bottom horizontal support 19' of wall member 17 (see FIG. 10). As shown in FIG. 9, wall members 17 and 17' are in slightly staggered relationship in order to effect this interengagement of the parts. Loading of the machine is completed by lifting the packer assembly 16 to a position intermediate walls 17 and 17' so that the bottom plate 40 thereof rests on supports 33 and 33' of angular brace pieces 23 and 23'. As shown in FIGS. 8 and 10, members 33 and 33' are so located that, when loaded on truck 48, they form a substantial platform for crusher assembly 16. By virtue of its considerable weight, crusher assembly 16 exerts a downward force on wall member 17 and 17' which are superior to any forces tending to accidentally displace the wall members from the truck in transit.

It has been found that optimum results are obtained by employing heavy steel plate walls approximately 17 feet long and 6½ feet high, said walls being placed vertically on the ground in opposed parallel relationship about 7 feet apart. The crusher assembly is preferably the same length as the walls but of considerably less width than confining chamber 15, the assembly including a heavy steel plate bottom and light-weight sides approximately 21 inches high. The lightness of the side pieces prevents the crusher from rolling against the steel walls and the height thereof prevents material from hanging on the assembly after it is dropped on the bodies. The portable machine of the present invention is very rugged and of a construction which is not complex, resulting in a device which is relatively inexpensive to manufacture and maintain. The portability of this unit enables it to be set up among the groups of scrap automobile bodies to be bundled. In cases where the terrain is uneven, blocks 25 can be left out or varied in size to compensate for the contour of the ground.

With the device of the present invention, it will be apparent that the width and length of the crusher metal bundle is such that it may be readily accommodated on the truck used to transport the machine. It has further been found in actual use that with the portable crushing machine constructed in accordance with the present invention, in a day's time, two men can process 72 scrap automobile bodies (approximately 37 tons) and load them on two trailer trucks. The trucks are thereby filled to their weight capacity. Without such processing, each truck would have room for only four scrap automobile bodies. From this, it follows that by partly processing the salvaged metal and crushing, for example, six scrap automobile bodies into a single bundle, a large-size hydraulic press designed to press one uncrushed automobile body at a time, is enabled to process six bodies at a time, thereby increasing the production of the press many times in the same period formerly required to bale one scrap body. The present method and apparatus also enables the salvage dealer to extend the radius of his operation to cover a greater area, since the trucking cost per ton mile is drastically reduced by loading the trucks to their weight capacity rather than filling the truck with scrap metal in a loose condition, which enables the truck to be loaded to only approximately one-eighth of its weight capacity.

While I have herein shown and described a preferred embodiment of my invention, it is nevertheless to be understood that various changes may be made therein without departing from the spirit and scope of the appended claims.

What I claim is:

1. In a portable crushing machine for reducing automobile bodies to a relatively flat state, for use as scrap metal, a pair of portable wall members adapted to be set up on a supporting surface in opposed spaced parallel relation to form a chamber between which the automobile bodies to be crushed are placed, means to detachably retain said wall members in predetermined spaced relation, crushing means pendently supported above said chamber, wall supports engaged with the rear faces of said wall members and extending outwardly from the base thereof, to stabilize the wall members, the supports of one of said wall members being at a 90° angle thereto to retain said wall in a vertical position, the supports of the other said wall member extending at less than a 90° angle to normally retain the last said wall member offset from the vertical, means engageable with the supports of the offset wall to move the latter into a vertical position parallel to the first said wall, before the automobile bodies are crushed, said means being disengageable from the supports, permitting the latter to gravitate and pull the wall into its offset position while the crushed automobile bodies are being removed from between said wall members.

2. A portable knock-down machine for reducing automobile bodies to a relatively flat state, including a confining chamber composed of a pair of independent parallel walls, the walls being set up on the ground in such a manner that the ground constitutes the fixed floor of the chamber, base supports for stabilizing the walls on said floor, flexible means spanning the space between said walls, and engaged with the latter, for detachably holding the walls in predetermined spaced relation, said chamber adapted for the successive reception, on its floor, one above the other, of automobile bodies to be crushed, crushing means pendently supported above said confining chamber, for crushing impact on top of each body after it is deposited in said chamber, and power means connected to said crushing means for elevating the latter, after it has gravitated from a predetermined height, into engagement with the automobile bodies in the confining chamber.

3. The machine of claim 2 including girdle means extending across the said ground and upwardly over the tops of the walls, the girdle means being adapted to be brought together above the crushed automobile bodies, the said power means being engaged with the girdle means at a point above the crushed automobile bodies for hoisting said bodies en masse from the confining chamber after completion of the crushing cycles.

References Cited in the file of this patent

UNITED STATES PATENTS

| 937,436 | Haag | Oct. 19, 1909 |
| 1,259,843 | Fitzgerald | Mar. 19, 1918 |
| 2,418,550 | Edwards | Apr. 8, 1947 |
| 2,675,718 | Finney | Apr. 20, 1954 |
| 2,986,992 | Patros et al. | June 6, 1961 |
| 2,987,989 | Freeman | June 13, 1961 |

FOREIGN PATENTS

| 52,053 | Switzerland | Apr. 25, 1910 |
| 218,745 | Great Britain | July 14, 1924 |